US012692890B2

(12) United States Patent
Pleuhs et al.

(10) Patent No.: US 12,692,890 B2
(45) Date of Patent: Jul. 28, 2026

(54) SNAP-FITTING CONNECTING DEVICE WITH IMPROVED TENSILE STRENGTH

(71) Applicant: BONTAZ CENTRE, Marnaz (FR)

(72) Inventors: Adrien Pleuhs, Annecy (FR); Boris Marie Frédéric Goisque, La Roche sur Foron (FR)

(73) Assignee: BONTAZ CENTRE, Marnaz (FR)

( * ) Notice: Subject to any disclaimer, the term of this patent is extended or adjusted under 35 U.S.C. 154(b) by 99 days.

(21) Appl. No.: 18/556,483

(22) PCT Filed: Apr. 21, 2022

(86) PCT No.: PCT/FR2022/050756
§ 371 (c)(1),
(2) Date: Oct. 20, 2023

(87) PCT Pub. No.: WO2022/223930
PCT Pub. Date: Oct. 27, 2022

(65) Prior Publication Data
US 2024/0191741 A1     Jun. 13, 2024

(30) Foreign Application Priority Data
Apr. 21, 2021    (FR) ...................................... 2104164

(51) Int. Cl.
*F16B 21/07*        (2006.01)
*F16K 31/06*        (2006.01)
(52) U.S. Cl.
CPC ........ *F16B 21/073* (2013.01); *F16K 31/0627* (2013.01)

(58) Field of Classification Search
CPC ........ F16K 1/48; F16K 11/044; F16B 21/073; F16B 21/071; F16B 21/16
See application file for complete search history.

(56) References Cited

U.S. PATENT DOCUMENTS 1,397,101 A * 11/1921 Kelly ..................... G09F 3/0317
                                                       411/530
3,155,367 A * 11/1964 Gifford ................... F16K 1/482
                                                        251/86
(Continued)

FOREIGN PATENT DOCUMENTS

EP        3628853 A1      4/2020
GB        2059016 A       4/1981

OTHER PUBLICATIONS

International Search Report for PCT/FR2022/050756 dated Sep. 28, 2022.
Written Opinion for PCT/FR2022/050756 dated Sep. 28, 2022.

*Primary Examiner* — Umashankar Venkatesan
(74) *Attorney, Agent, or Firm* — McDonald Hopkins LLC

(57)                ABSTRACT
A device for connection between a first piece and a second piece including: a male part and a female part, the male part being intended to be inserted in the female part along the first direction, the male part including a snapping-on portion and a guide portion downstream of the snapping-on part in the direction of insertion of the male part in the female part, the female part including a snapping-on portion and a guide portion downstream of the snapping-on part, the male part and the female par being such that the guide portions provide guidance in the first direction of the male part before the snapping-on portions cooperate with each other.

18 Claims, 6 Drawing Sheets

(56) References Cited

U.S. PATENT DOCUMENTS

| | | | | |
|---|---|---|---|---|
| 3,381,351 | A * | 5/1968 | Szwargulski | ..... B29C 45/14262 |
| | | | | 137/434 |
| 3,670,630 | A * | 6/1972 | Tyson | ..................... F16B 21/16 |
| | | | | 403/135 |
| 4,936,543 | A * | 6/1990 | Kamibayasi | ........ F16K 31/0658 |
| | | | | 251/121 |
| 10,151,397 | B2 * | 12/2018 | Mann, III | ................. F16K 1/36 |
| 10,626,996 | B2 * | 4/2020 | Voss | .......................... F16F 9/34 |
| 10,738,893 | B2 * | 8/2020 | Haeusser | ............ F16K 31/0655 |
| 2002/0036017 | A1 * | 3/2002 | Leys | .................. F16K 31/1262 |
| | | | | 137/625.66 |
| 2007/0251588 | A1 | 11/2007 | Linder et al. | |
| 2011/0017934 | A1 | 1/2011 | Zui et al. | |

* cited by examiner

SNAP-FITTING CONNECTING DEVICE WITH IMPROVED TENSILE STRENGTH

TECHNICAL FIELD AND PRIOR ART

The present invention relates to a device for snapping-on connection between two pieces having improved tensile strength and to a hydraulic control valve including at least one such device.

There are various devices and techniques for connecting two elements. Hoping offers very good mechanical strength. It applies mainly to steel parts and requires applying a certain temperature, which can damage some of the assembled elements. Furthermore, using hooping requires special equipment. Hot riveting is adapted to pieces made from plastics material, however, remelting a piece made from plastics material can pose problems of strength of the material and the force necessary for shaping can damage the peripheral pieces. Use of riveting also requires special equipment.

Securing by clipping or snapping on provides an assembly based on elastic deformation of the parts during assembly. In general, one of the pieces to be assembled includes two arms and the other piece includes a through bore. The two arms pass through the bore while deforming elastically and resume a substantially non-deformed position when their ends emerge from the bore. Assembly by snapping on does not requires specific equipment, but it generally offers tensile strength that is not sufficient for some applications, for example in control valves for a cooling circuit in the automobile field.

DESCRIPTION OF THE INVENTION

Consequently one aim of the present invention is to offer a device for connection between two pieces not having the aforementioned drawbacks, offering increased resistance to axial stress and facilitated assembly.

The aim stated above is achieved by a device for connection between two pieces, for example as described below, including a male part and a female part, the male part cooperating with the female part so as firstly to elastically deform the female part when it is inserted in the female part and secondly to be guided axially downstream of the snapping-on zone, in the snapping-on direction, throughout the snapping-on phase facilitating assembly. This connection offers very good resistance to axial stress.

In other words, each of the male and female parts includes a part participating in the snapping on and a part participating in the relative axial guidance of the male part and female part.

Thus, by guaranteeing axial movement between the male part and the female part, the assembly phase is facilitated and the connection is made more robust.

Preferably, the male part includes a rod downstream of its snapping-on part and the female part includes a bore downstream of its snapping-on part receiving the rod of the male part, the bottom of the bore and the free end of the rod are such that they cooperate when the snapping-on phase is ended, securing the connection.

One of the objects of the present invention is a device, for example as described above, for connection between a first piece and a second piece intended to be stressed in a first direction, including:

a male part intended to be secured to the first piece and a female part intended to be secured to the second piece, the male part being intended to be inserted in the female part along the first direction, the male part including at least one guide portion and a snapping-on portion, the guide portion being disposed downstream of the snapping-on part in the direction of insertion of the male part in the female part, the female part including a guide portion and a snapping-on portion, the guide portion being disposed downstream of the snapping-on part in the direction of insertion of the male part in the female part, the male part and the female part being configured so that the guide portions cooperate with each other and provide guidance in the first direction of the male part before the snapping-on portions cooperate with each other.

Such a connection device can include a first shoulder that connects the guide portion (P1) of the male part (M) and the snapping-on portion (P2) of the male part (M). For example, the snapping-on portion (P2) of the male part (M) includes a bevel bordering the first shoulder, the bevel narrowing in the direction of the guide portion (P1) of the male part (M).

According to another embodiment, a connection device according to the invention can include a bevel that connects, preferably directly, the guide portion (P1) of the male part, or the diameter of this guide portion, and the snapping-on portion (P2) of the male part, or the diameter of this snapping-on portion.

In an advantageous example embodiment, the guide portion of the male part includes a cylindrical shape of revolution with a first diameter, and the snapping-on portion of the male part includes a cylindrical shape of revolution with a second diameter greater than the first diameter and delimiting a shoulder oriented towards the first piece. Preferably, the guide portion of the female part can include a bore sized to receive the guide portion of the male part and/or the snapping-on portion of the female part can include at least one arm provided with a finger intended to cooperate with the shoulder of the male part and to form an axial stop for the male part.

A connection device according to the invention can include a bevel between the guide portion of the male part and the snapping-on portion of the male part, and/or the finger can include an insertion edge, opposite to a stop face intended to come into contact with a shoulder, or the second shoulder, intended to cooperate with said bevel to facilitate the moving of the at least one finger away from the first direction in the second direction.

Advantageously, the dimension of the guide portion of the male part in the first direction is such that it enters the bore of the female part before the snapping-on portion of the male part begins to cooperate with the snapping-on portion of the female part.

According to an additional feature, the bore includes a bottom, the distance between the bottom of the bore and the axial stop faces of the fingers preferably being greater than the distance between the free end of the guide portion of the male part and the shoulder. The bottom of the bore can form an axial stop for the free end of the guide portion of the male part in the direction of insertion of the male part in the female part.

In an example embodiment, the snapping-on portion of the female part can include two arms each provided with a finger intended to cooperate with the shoulder of the male part and to form an axial stop for the male part, said arms being for example diametrically opposed.

According to another additional feature, the male part includes a portion for connection between the snapping-on portion and the first piece, the diameter of which is equal to the first diameter.

The male part and the female part are advantageously manufactured from the same material, advantageously from plastics material, for example selected from polyphenylene sulfide (PPS), the polyaryletherketone (PAEK) family, the polyethersulfone (PESU) family, polyetheretherketone (PEEK) and polyphthalamide (PPA).

Another object of the present application is a method for assembling a first piece and a second piece by means of the connection device according to the invention, as described above or in the remainder of this application, the first piece including the male part and the second piece including the female part, including:

aligning the male part and the female part in the first direction,
  inserting the male part in the female part by relative movement along the first direction and cooperation of the guide portion of the male part and the guide portion of the female part, and then
  snapping on by cooperation of the snapping-on portion of the male part with the snapping-on portion of the female part until the male part is axially held in the female part in a direction opposite to the insertion direction, the cooperation of the guide portion of the male part and the guide portion of the female part continuing during the snapping-on phase.

Another object of the present application is a hydraulic control valve including an electromagnetic actuator, a first piston cooperating with a piston seat, and at least one device according to the invention for connection between the first piston and a rod secured to the core at least in the first direction.

The control valve can be a 3/2 control valve, including a second piston secured to the first piston in the first direction, the first piston and the second piston being aligned in the first direction.

The first piston and the second piston can be in a single piece.

Another object of the present application is a hydraulic circuit including at least one hydraulic control valve according to the invention and a fluid source connected to the hydraulic control valve.

Another object of the present application is a cooling circuit for a motor vehicle, at least one hydraulic control valve according to the invention and a source of cooling fluid connected to the hydraulic control valve.

BRIEF DESCRIPTION OF THE DRAWINGS

The present invention will be understood better on the basis of the following description and the appended drawings, on which.

DETAILED DESCRIPTION OF PARTICULAR EMBODIMENTS

Figure 1:
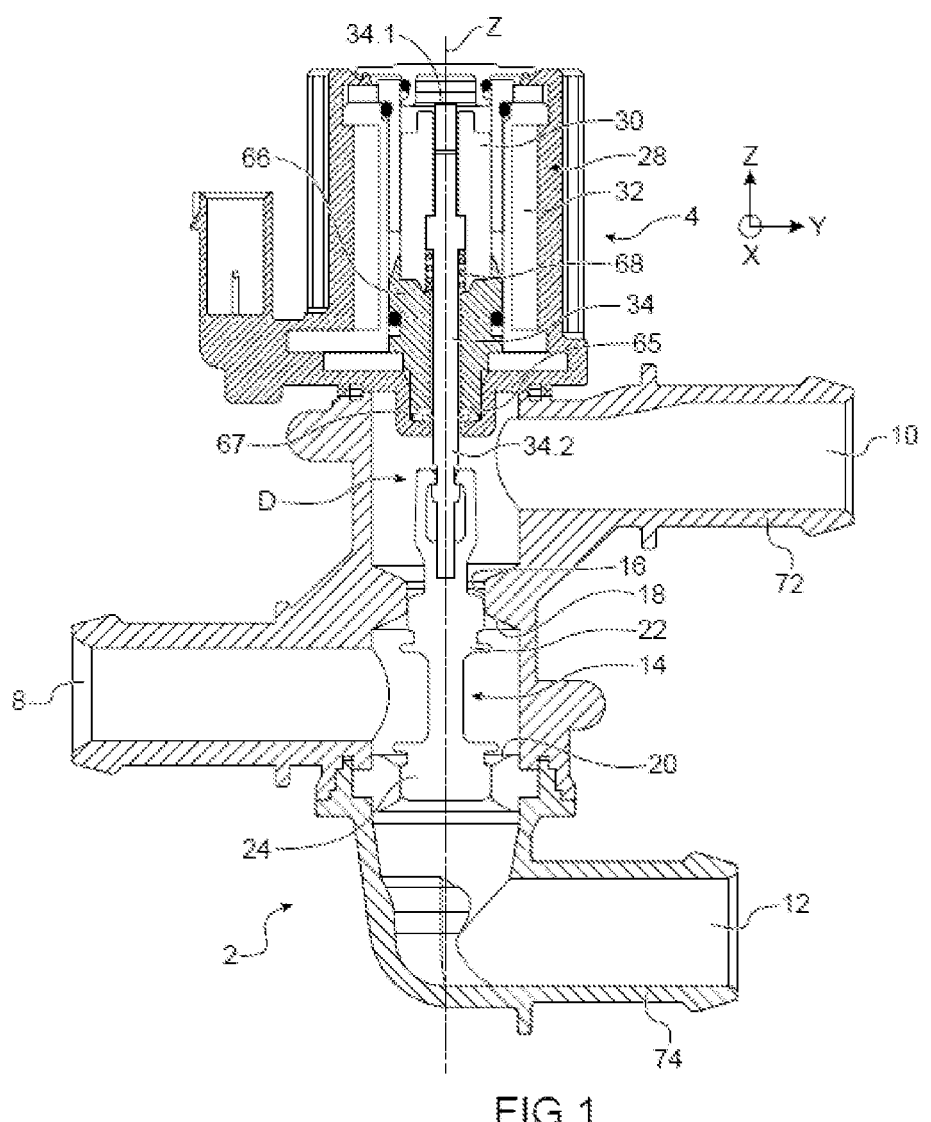
FIG. 1 is a view in longitudinal section of an example of a 3/2 hydraulic control valve using a connection device according to an example embodiment.

In the following description the terms "upstream" and "downstream" are considered with respect to the direction of insertion of the male part in the female part.

The connection device D according to the invention is intended to secure two pieces. In the following description, the connection device D will be described more particularly as a device for connection between a moving component of a control valve and an electromagnetic actuator of the control valve shown on FIG. 1. It will be understood that the connection device according to the invention can provide the mechanical connection between any pieces intended to slide along a first direction.

In this non-limitative example, the control valve is a 3/2 control valve including a hydraulic part 2 and an electromagnetic actuation part 4.

The hydraulic part 2 includes a body provided with an inlet 8 and two outlets 10, 12 and a moving component 14 intended to orient the fluid from the inlet 8 to one or other of the outlets 10, 12. The inlet 8 and the two outlets 10, 12 are connected to a channel 16 in which the moving component is mounted so as to be able to slide along a first direction Z. The channel 16 can include two valve seats 18, 20 and the moving component 14 includes two obturators or pistons 22, 24 arranged on the moving component and with respect to the seats 18, 20, so that the obturator 22 can come into abutment against the valve seat 18, and the obturator 24 can come into contact with the valve seat 20 alternatively. Depending on the axial position of the moving component 14 in the channel 16, either the piston 22 can be in abutment against the valve seat 18 and the fluid circulates from the inlet to the outlet 12, or the piston 24 can be in abutment against the valve seat 20 and the fluid circulates from the inlet 8 to the outlet 10. In this example, the moving component 14 is in a single piece. In this example, the valve seat 20 is an attached piece.

The moving component 14 can be mechanically connected to an electromagnetic actuator 28 including a core 30 mounted in a coil 32. The core 30 is preferably able to move axially along the first direction Z in the coil 32 when a current passes through it. The core 30 can be constrained to move with the moving component 14 along the first direction Z. In this example the axial securing of the core and moving component is obtained by a rod 34 connected by a first end 34.1 to the core 30 and by a second end 34.2 to the moving component.

In this example, the end 34.2 of the rod 34 is connected to the moving component 14 by the connection device D, the details of which are visible on FIGS. 2 to 6C.

The connection device D (FIG. 2) includes a male part M (FIG. 3) formed by the first end of the rod 34 and a female part F (FIGS. 4 and 5) formed by a longitudinal end of the moving component 14.

Figures 3, 4:
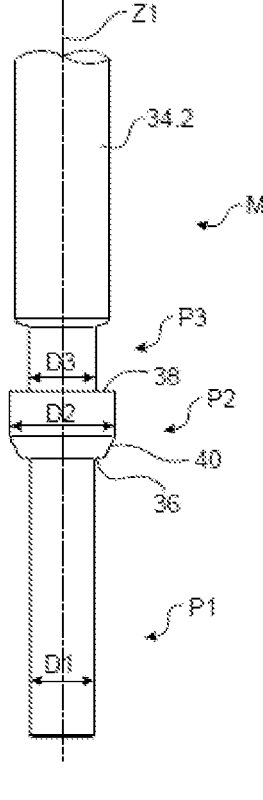
FIG. 3 is a side view of the male part of the connection device of FIG. 2 shown alone.
FIG. 4 is a perspective view of the female part of the connection device of FIG. 2 shown alone.
Figure 5:
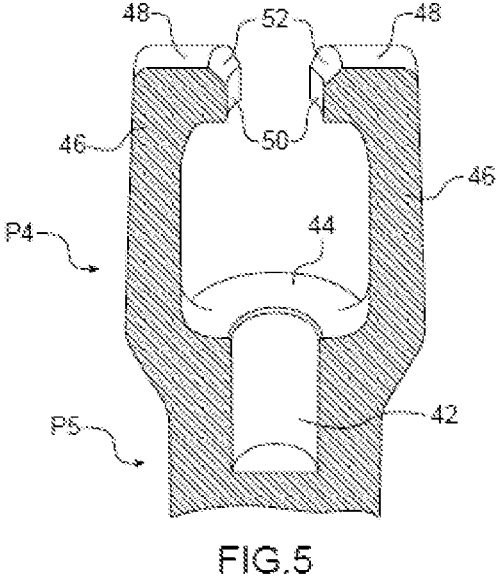
FIG. 5 is a view in longitudinal section of the female part.

On the example embodiment in FIG. 3, a side view of the male part M can be seen. The male part M extends along an axis Z1. The male part M preferably includes three portions distributed along the axis Z1:

a guide portion P1,
  a snapping-on portion P2, a connection portion P3 connecting the male part M to one of the pieces to be connected, in the present case the rod 34.

The guide portion P1 is located at the free end of the male part M and the snapping-on portion P2 is located upstream of the guide portion P1 in the direction of insertion of the male part in the female part.

The guide portion P1 is for example cylindrical in shape of revolution with a diameter D1. The snapping-on portion P2 has for example also a roughly cylindrical shape with a diameter D2, D2 being greater than D1. In this example, a first shoulder 36 connects the guide portion P1 and the snapping-on portion P2. Highly advantageously, the snapping-on portion P2 includes a bevel 40 bordering the first shoulder 36, the bevel 40 narrowing in the direction of the guide portion P1. In a variant, the first shoulder 36 is replaced by a bevel that directly connects the diameter of the guide portion P1 and the diameter of the snapping-on portion P2.

The connection portion P3 can also have a roughly cylindrical shape of revolution with a diameter D3, D3 being less than D2. Thus, a second shoulder 38 connects the snapping-on portion P2 and the connecting portion P3. In the example shown and preferably, D1 is equal to D3.

The female part F extends along an axis Z2. The female part F includes a snapping-on portion P4 and a guide portion P5 disposed axially downstream of the snapping-on portion P4 in the direction of insertion of the male part in the female part.

The guide portion P5, which connects the snapping-on portion P4 and the other piece to be connected, in the present case the moving component 14, includes in this example a non-through bore 42 of axis Z2 and emerging by one end in a face 44 oriented towards the snapping-on portion P4. The diameter of the bore 42 is for example close to that of the guide portion of the male part to allow sliding thereof with a small clearance. Preferably, the clearance at the diameter is between 0 µm and 40 µm in accordance with the ISO H8h7 tolerance for a standard Shaft in Bore assembly.

The snapping-on portion P4 can include two arms 46 extending axially from the face 44 and preferably disposed so as to be diametrically opposite in the second direction Y normal to the direction Z. The arms 46 can each include, at their free end 46.1, a finger 48 extending radially in the direction of the axis ZI and intended to cooperate with the second shoulder 38 of the male part M to form an axial stop for the male part M.

The free end of each finger 48 preferably includes a concave face 50 with a radius of curvature equal to or close to the radius of the guide portion P1 and of the connecting portion P3 so as to surround the connection portion P3 after snapping on. Furthermore, the concave faces 50 can advantageously include an insertion edge 52 inclined towards the axis Z2 in the direction of insertion of the male part in the female part and advantageously cooperating with the bevel 40 facilitating snapping on.

By virtue of the guidance obtained by the cooperation of the guide portions P1 and P5, a single arm can be used. According to another variant, more than two arms are used, regularly distributed around the axis Z2.

Preferably, the distance between the free end of the male part M and the second shoulder 38 is less than, or slightly less than, the distance between the bottom of the bore 42 and the stop faces carried by the fingers 48, so as to guarantee, at the end of the snapping-on step, that the fingers 48 are indeed disposed downstream of the second shoulder 38 and that the arms resume a substantially non-deformed shape while limiting the axial movement between the male part and the female part. The clearance tolerance between the distance between the free end of the male part M and the second shoulder 38 is for example slightly less than the distance between the bottom of the bore 42 and the stop faces carried by the fingers 48; it can be between 0 µm and 80 µm.

Furthermore, the length of the guide portion P1 of the male part is such that it enters the bore of the female part, before the snapping-on portion P2 of the male part begins to cooperate with the snapping-on portion P4 of the female part. Thus, during the snapping-on action, the male part M is guided in the female part F, which facilitates assembly. Furthermore, keeping the male part aligned with the female part makes the connection stronger, otherwise the male part could separate from the female part under the application of a force in the direction X transverse to the arms (direction Y) and to the axis Z.

The assembly of the female part and male part will now be described with the help of FIGS. 6A to 6B.

Figure 6A:
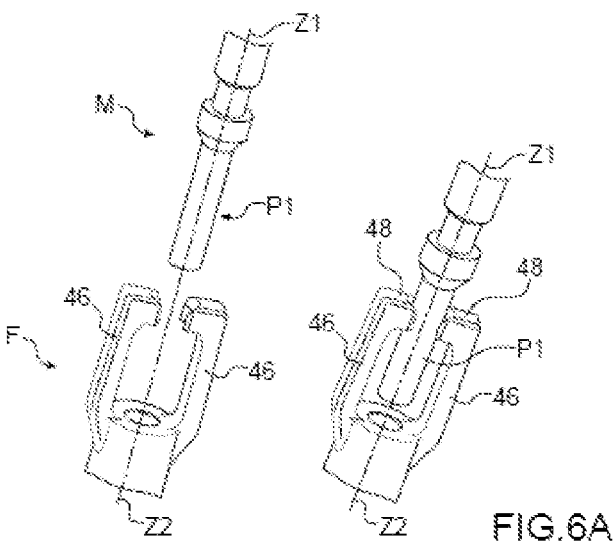
FIG. 6A
Figure 6B:
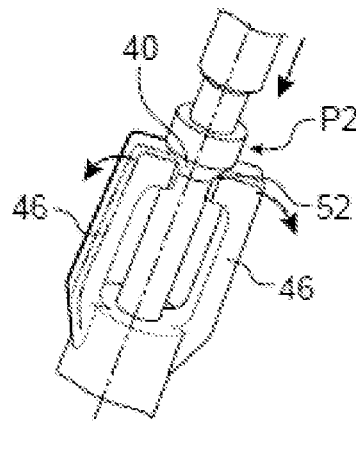
FIG. 6B
Figure 6C:
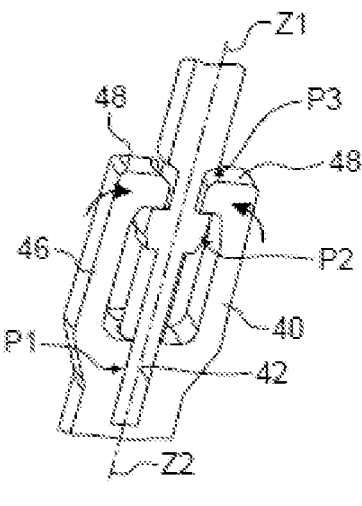
FIG. 6C are views showing various phases of the assembly method by the connection device of FIG. 2.

The male part M and the female part F are moved together while aligning the axes Z1 and Z2, the guide portion P1 of the male part sliding between the fingers 48 of the arms 44 of the female part (FIG. 6A).

Next, the guide portion P1 of the male part enters the bore 42. The snapping-on portion P2 of the male part comes into contact with the fingers, more particularly the bevel 40 encounters the insertion edges 52 carried by the radially internal ends of the fingers 48, which causes a separation of the fingers 48 from each other in the direction Y by elastic deformation of the arms 46. Because of the cooperation of the guide portion P1 and the bore 42, the male part M remains aligned with the female part F, avoiding any risk of tilting between the two parts and facilitating assembly.

The snapping-on portion P2 slides on the radially internal end of the fingers 48. When the male part M has sufficiently entered the female part F, the snapping-on portion P2 is located downstream of the fingers 48, the arms 46 resume their non-deformed position and the fingers 48 cooperate with the second shoulder 38 to form an axial stop. As indicated above, the distance between the free end of the male part M and the second shoulder 38 is preferably less than, or slightly less than, the distance between the bottom of the bore 42 and the stop faces carried by the fingers 48, so as to guarantee that the fingers are indeed located downstream of the second shoulder 38 and that the arms 46 resume a substantially non-deformed shape while limiting the axial movement between the male part and the female part.

In the example shown, the downstream sliding of the male part M in the female part F is limited by the contact between the free end of the guide portion P1 and the bottom of the bore 42. In a variant, this sliding is limited by the abutment of the fingers against a shoulder formed between the connecting portion P3 and the rod 34. According to another variant, the first shoulder 36 enters the guide portion P1 and the snapping-on portion P2 is disposed axially so as to come into abutment against the face 44 of the female part 44, limiting the downstream sliding of the male part M in the female part F.

The device D for connection by axial assembly furthermore has the advantage of not requiring a through bore, unlike the snapping-on devices of the prior art produced by pressure injection and/or without a machining step, which makes it possible to assemble two pieces extending axially end to end by snapping-on.

Preferably, the male part M and the female part F are manufactured in the same material, which makes it possible to obtain an assembly that does not change according to temperature. Alternatively, the male part and the female part are manufactured in materials having similar or equal thermal expansion coefficients.

Preferably, the material or materials selected is or are little or not deformable under bending and have low elastoplastic deformations. For example, the materials have deformation at failure of the order of 2% and a Young's modulus of the order of 12,000 MPa.

Advantageously, the male part and the female part are manufactured from plastics material, preferably by moulding, preferably by plastic injection. The plastics material is preferably polyphenylene sulfide (PPS). In a variant, it can be selected from the family of polyethersulfones (PESU), the family of polyaryletherketones (PAEK), polyetheretherketone (PEEK) and polyphthalamide (PPA).

We shall now describe more particularly the invention applied to the manufacture of the 3/2 control valve of FIG. 1.

The connection device according to the invention is particularly adapted to connect the core 30 of an electromagnetic actuator to a piston or a moving component carrying two pistons.

In this example, the core is secured in the direction Z to the moving component 14 by the rod 34 that is itself secured in the direction Z firstly to the core and secondly to the moving component 14.

The core has a tubular shape through which a bore 58 passes.

Figure 2:
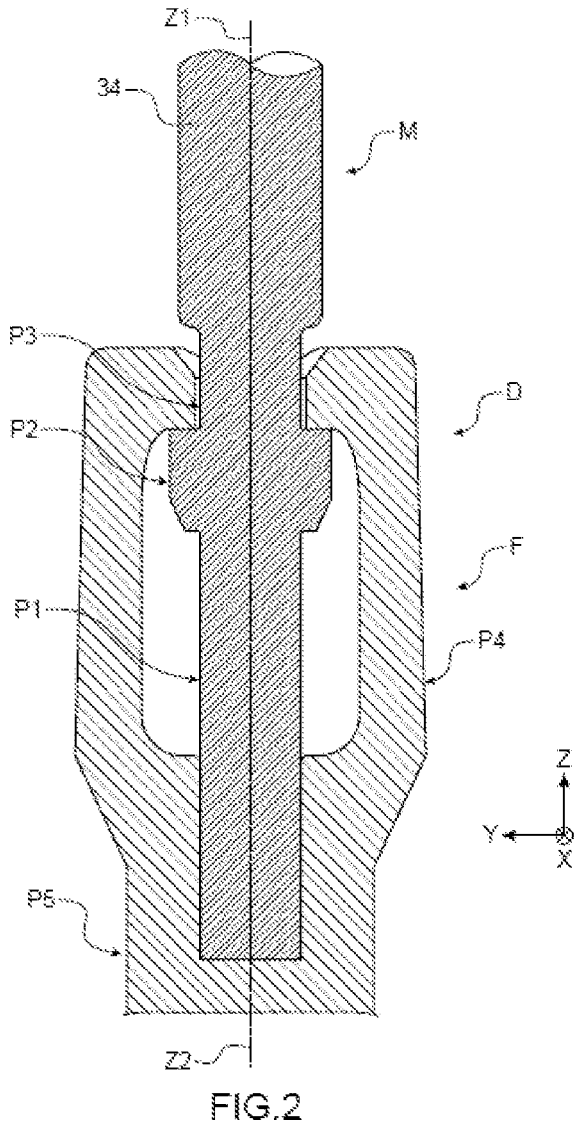
FIG. 2 is an enlarged view of the connection device used in the control valve of FIG. 1.

For example, the rod 34 includes at its first longitudinal end 34.1 snapping-on means (not shown) providing the securing together of the rod 34 and the core 34 and at a second longitudinal end 34.2 the male part M of the connection device of FIGS. 2 and 3.

The snapping-on means can include two lugs parallel to the axis of the rod 34 and provided at their free end with radial extensions towards the outside. When the rod 34 and the core are assembled, the lugs enter through one end of a bore formed in the core while moving towards each other by elastic deformation, the rod 34 is moved axially in the bore until the radial extensions of lugs emerge from the bore, enabling the lugs to resume their initial shape and to provide with the radial extensions an axial securing together of the core and the rod. After this assembly has taken place, the rod 34 and the core are positioned in the body of the actuator, for this purpose the second end 34.2 carrying the male part M is introduced into the body of the actuator and passes through a seal 65 mounted between a casing 67 of the actuator and a piece 66 that provides the closure of the magnetic loop. The piece 66 forms a seat for the seal 65 and also fulfils the function of seat for a spring 68 interposed between the core and the piece 66. The spring 68 is intended to serve as a return spring and is stressed under compression.

Thanks to the circular cross-section of the connecting device D and of the rod 34, the seal 65 is not damaged by the passage of the male part of the connection device.

The casing 72 is next mounted around the male part M and is secured, for example welded, to the casing 67 of the actuator.

The moving component 14 includes, at a first longitudinal end, the female part of the connection device.

The moving component 14 is secured to the rod 34 in accordance with the steps described above, the female part F carried by the moving component 14 is moved axially towards the male part M carried by the rod 34 until the fingers come into abutment against the second shoulder 38 of the snapping-on portion P2 of the male part M.

The piston 22 cooperates with the seat 18 carried by the casing 72, which keeps the moving component in position aligned along the axis Z thanks to the return force of the spring and of the connection D operating under traction during assembly.

Next, the second casing 74 is secured, for example welded, to the first casing 72.

The manufacture of the control valve of FIG. 1 has ended.

Figure 7:
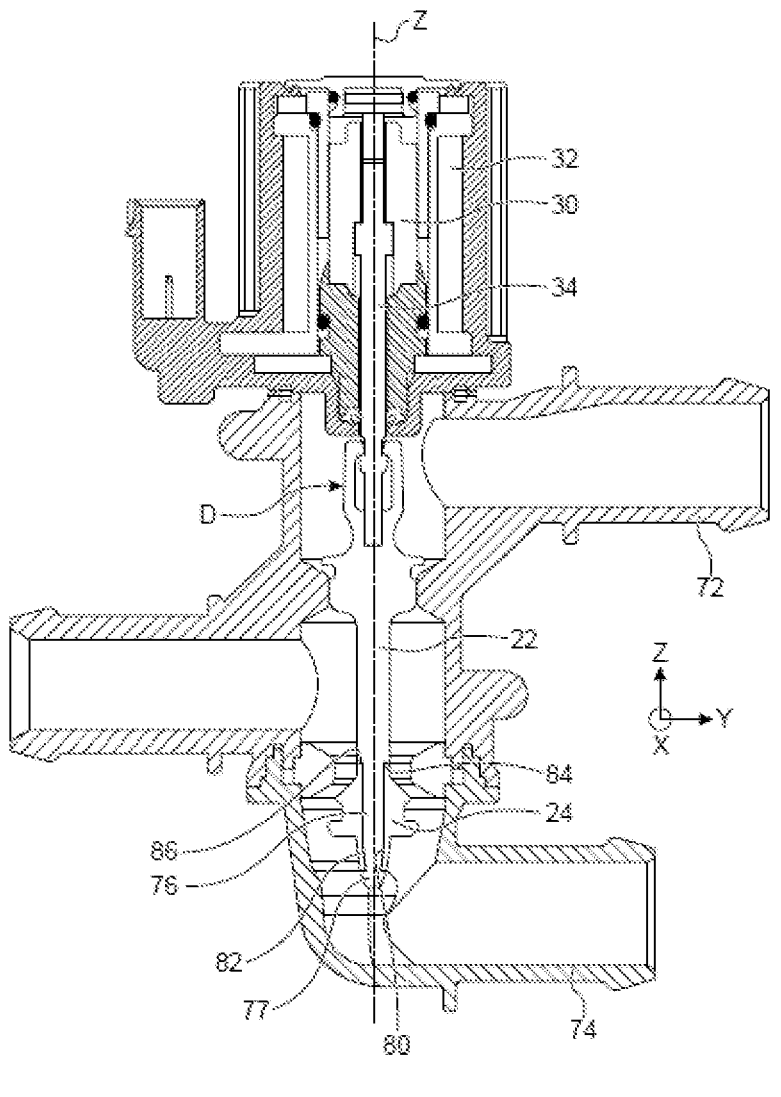
FIG. 7 is a view in longitudinal section of another example of a 3/2 hydraulic control valve using a connection device according to an example embodiment.

On FIG. 7, a second example embodiment of a hydraulic control valve can be seen, including a connection device D according to the invention, in which the moving component is in two parts: the piston 20 and the piston 22. Assembly thereof takes place during the manufacture of the control valve.

An example of the method for assembling this control valve is described below.

The first piston 22 includes, at a first longitudinal end, the female part F of the connection device. In this example, the first piston 22 is configured to be connected to a second piston 24, its second end is then designed for connection to another piston.

The first piston 22 is secured to the rod 34 in accordance with the steps described above, the female part F carried by the first piston 22 is moved axially towards the male part M carried by the rod 34 until the fingers come into abutment against the shoulder of the snapping-on portion P2.

When the control valve is assembled, after the core is secured to the first piston via the rod 34, the casing 72 is mounted around the first piston 22 and is secured, for example welded, to the casing 67 of the actuator. Next the second piston 24 is secured to the second end of the first piston 22, for example by snapping on. For example, the first piston 22 is extended by a rod 76 provided with a head 77 with a diameter greater than that of the rod 76, the head 77 delimiting with the rod a first shoulder 78. The second piston 24 has a passage 80 passing through it and is provided, on the face opposite to the one oriented towards the first piston 22, with lugs 82 extending axially in line with the passage 80 and the free ends of which are intended to cooperate with the shoulder 78 by snapping on. Furthermore, the rod 76 includes a second shoulder 84 downstream of the shoulder 78 in the direction of insertion of the piston on the rod 76 and facing the first shoulder 78. The axial position of the second shoulder is selected so as to come into abutment against an axial end 86 of the second piston 24 on the face opposite to the one carrying the lugs 82. The cooperation of the lugs and of the first shoulder and the abutment of the axial and 86 and of the second shoulder 84 provide the axial immobilisation of the second piston with respect to the first piston. In a variant, the second shoulder 84 is replaced by other snapping-on means cooperating with the axial end 86.

The operation of the assembly of the second piston on the first piston is implemented in the following manner:

The head 77 enters the second piston 24, emerges from the passage 80, slides between the lugs 82, which it deforms elastically. The head 77 slides between the lugs 82 until it escapes from them. The lugs 82 resume their non-deformed position and come into abutment against the shoulder 78. Simultaneously, the axial end 86 of the second piston 24 comes into abutment against the second shoulder 84 of the first piston, providing axial immobilisation of the second piston 24 on the first piston 22.

This assembly is also facilitated by the aligned position of the first piston. This assembly offers very good strength since the lugs are then stressed in compression by the hydraulic pressure that is exerted on the second piston towards the bottom in the representation in FIG. 1.

Next, the second casing 74 is secured, for example welded, to the first casing 72.

In the above description the male part is carried by a rod. It will be understood that it can be carried by any piece having a different shape. The same applies to the female part.

Advantageously, means (not shown) can be provided for immobilising, with respect to rotation about the axis Z, the first piston with respect to the rod 34 and the second piston with respect to the first piston.

The connection device according to the invention can be applied to the assembly of any pieces in an axial direction requiring increased tensile and compressive strength. The connection device is adapted to manufacturing any type of valve, in particular solenoid valves, and any type of control valve. It is adapted to hydraulic circuits, in particular in the automobile field and more particularly to cooling circuits for the automobile field.

The invention claimed is:

1. A device for connection between a first piece and a second piece intended to be stressed in a first direction, including:

a male part intended to be secured to the first piece and a female part intended to be secured to the second piece, the male part being intended to be inserted in the female part along the first direction, the male part including at least one first guide portion and a first snapping-on portion, the first guide portion being disposed downstream of the first snapping-on portion in the direction of insertion of the male part in the female part, the female part including a second guide portion and a second snapping-on portion, the second guide portion being disposed downstream of the second snapping-on portion in the direction of insertion of the male part in the female part, the male part and the female part being configured so that the first and second guide portions cooperate with each other and provide guidance in the first direction of the male part before the first and second snapping-on portions cooperate with each other, wherein the male part and the female part are manufactured from the same material.

2. The device according to claim 1, including a first shoulder that connects the first guide portion of the male part and the first snapping-on portion of the male part.

3. The device according to claim 2, wherein the first snapping-on portion of the male part includes a bevel bordering the first shoulder, the bevel narrowing in the direction of the first guide portion of the male part.

4. The device according to claim 1, including a bevel that directly connects the first guide portion, or its diameter, and the first snapping-on portion, or its diameter.

5. The device according to claim 1, wherein the first guide portion of the male part includes a cylindrical shape of revolution with a first diameter, and the first snapping-on portion of the male part includes a cylindrical shape of revolution with a second diameter greater than the first diameter and delimiting a shoulder, oriented towards the first piece, and wherein the second guide portion of the female part includes a bore sized to receive the first guide portion of the male part and the second snapping-on portion of the female part includes at least one arm provided with a finger intended to cooperate with the shoulder of the male part and to form an axial stop for the male part.

6. The device according to claim 1, including a bevel between the first guide portion of the male part and the first snapping-on portion of the male part, and wherein at least one finger includes an insertion edge, opposite to a stop face intended to come into contact with a shoulder, intended to cooperate with said bevel to facilitate the moving of the at least one finger away from the first direction in the second direction.

7. The device according to claim 6, wherein the first guide portion of the male part includes a cylindrical shape of revolution with a first diameter, and the first snapping-on portion of the male part includes a cylindrical shape of revolution with a second diameter greater than the first diameter and delimiting the shoulder, oriented towards the first piece, and wherein the second guide portion of the female part includes a bore sized to receive the first guide portion of the male part and the second snapping-on portion of the female part includes at least one arm provided with a finger intended to cooperate with the shoulder of the male part and to form an axial stop for the male part, and wherein the bore includes a bottom, the distance between the bottom of the bore and the axial stop faces of the fingers is greater than the distance between the free end of the first guide portion of the male part and the shoulder.

8. The device according to claim 7, wherein the bottom of the bore forms an axial stop for the free end of the first guide portion of the male part in the direction of insertion of the male part in the female part.

9. The device according to claim 1, wherein the dimension of the first guide portion of the male part in the first direction is such that it enters a bore, of the female part before the first snapping-on portion of the male part begins to cooperate with the second snapping-on portion of the female part.

10. The device according to claim 1, wherein the second snapping-on portion of the female part includes two arms each provided with a finger intended to cooperate with a shoulder, of the male part and to form an axial stop for the male part, said arms being diametrically opposed.

11. The device according to claim 1, wherein the male part includes a portion for connection between the first snapping-on portion and the first piece.

12. A method for assembling a first piece and a second piece by means of the connection device according to claim 1, the first piece including the male part and the second piece including the female part, including:

aligning the male part and the female part in the first direction, inserting the male part in the female part by relative movement along the first direction and cooperation of the guide portion of the male part and the guide portion of the female part, and then snapping on by cooperation of the snapping-on portion of the male part with the snapping-on portion of the female part until the male part is axially held in the female part in a direction opposite to the insertion direction, the cooperation of the guide portion of the male part and the guide portion of the female part continuing during the snapping-on phase.

13. The device according to claim 1, wherein the male part and the female part are manufactured from plastics material.

14. The device according to claim 13, wherein the male part and the female part are manufactured from a material selected from a group consisting of polyphenylene sulfide (PPS), the polyaryletherketone (PAEK) family, the polyethersulfone (PESU) family, polyetheretherketone (PEEK) and polyphthalamide (PPA).

15. A hydraulic 3/2 control valve, including an electromagnetic actuator, a first piston cooperating with a piston seat, at least one device for connection between the first piston and a rod secured to the core at least in the first direction, and a second piston secured to the first piston in the first direction, the first piston and the second piston being aligned in the first direction, the at least one device including:

a male part intended to be secured to the first piece and a female part intended to be secured to the second piece, the male part being intended to be inserted in the female part along the first direction, the male part including at least one first guide portion and a first snapping-on portion, the first guide portion being disposed downstream of the first snapping-on portion in the direction of insertion of the male part in the female part, the female part including a second guide portion and a second snapping-on portion, the second guide portion being disposed downstream of the second snapping-on portion in the direction of insertion of the male part in the female part, the male part and the female part being configured so that the first and second guide portions cooperate with each other and provide guidance in the first direction of the male part before the first and second snapping-on portions cooperate with each other.

16. The hydraulic 3/2 control valve according to claim 15, wherein first piston and the second piston are in a single piece.

17. A hydraulic circuit including at least one hydraulic 3/2 control valve according to claim 15 and a fluid source connected to the hydraulic 3/2 control valve.

18. A cooling circuit for a motor vehicle, at least one 3/2 hydraulic control valve according to claim 15 and a source of cooling fluid connected to the hydraulic control valve.

*   *   *   *   *